Aug. 16, 1966　　　J. L. WILSON　　　3,266,486
GAS BURNER THERMOSTAT UNIT
Filed May 18, 1964

INVENTOR.
JAMES L. WILSON
BY Charles B. Cannon
His Atty.

3,266,486
GAS BURNER THERMOSTAT UNIT
James L. Wilson, Chicago, Ill., assignor to Wilson Metal Products, Inc., Chicago, Ill., a corporation of Illinois
Filed May 18, 1964, Ser. No. 368,027
2 Claims. (Cl. 126—391)

This invention relates to a deep fat gas fuel frying apparatus and, more particularly, to thermostatic sensing devices for sensing the temperature of the gas burner tube and of the cooking oil surrounding the same in such deep fat gas fuel frying apparatus.

Various forms of thermostatic sensing devices have been known and used heretofore in gas fuel deep fat frying apparatus and many of these have been subject to certain difficulties, including problems of installation or mounting in the housings, bending of the thermostatic sensing tubes, and other difficulties.

Accordingly, an object of the present invention is to provide a new and improved deep fat fryer embodying a thermostatic control unit and a novel construction and arrangement for mounting the same which is of simple construction and lends itself to easy and ready installation in a deep fat fryer.

An additional object of the invention is to provide a deep fat fryer embodying a thermostatic sensing device which is so arranged and mounted that in use it readily determines or senses the temperature differential between the gas burner tube and the cooking oil.

Other and further objects will appear hereinafter.

Figure 1:
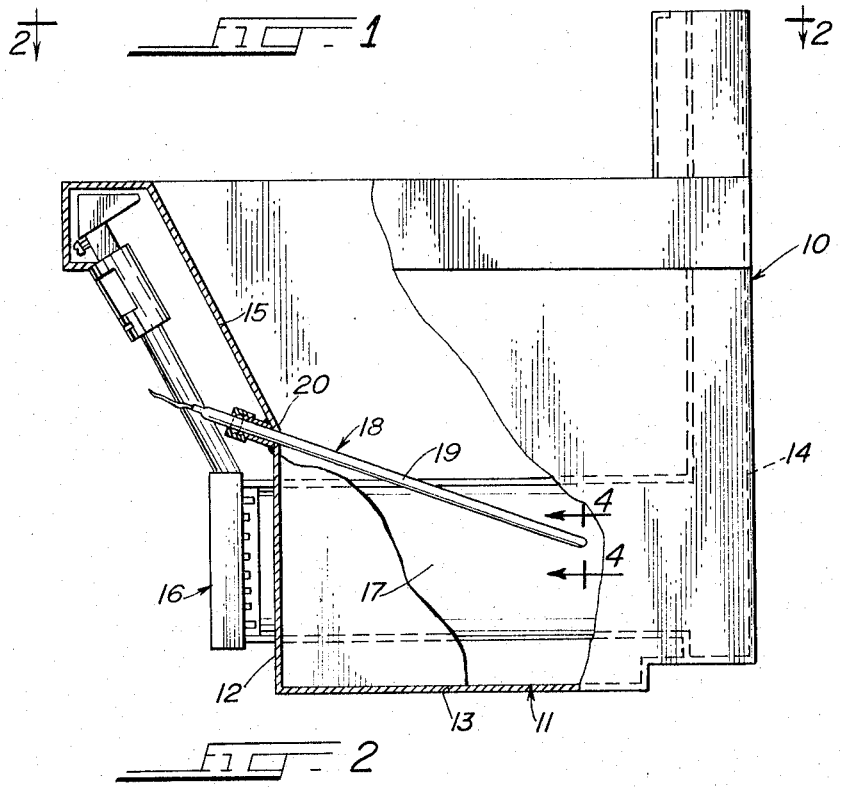
FIG. 1 is a fragmentary view, partly in section and partly in elevation, of a deep fat fryer embodying a preferred form of the present invention.
Figure 2:
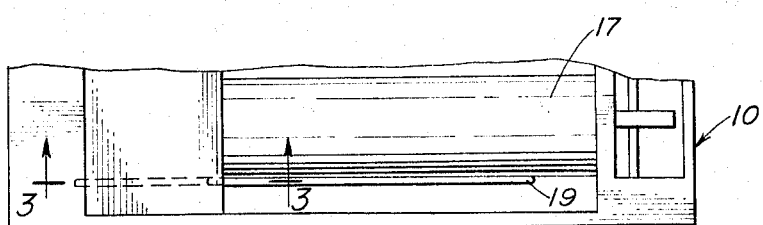
FIG. 2 is a top plan view on line 2—2 of FIG. 1.

A preferred form of the new deep fat fryer and thermostatic sensing unit therefor is illustrated in the drawing, wherein it is generally indicated at 10, and comprises a housing 11 including a body having a lower front wall 12, a bottom wall 13, and side walls 14, with the front wall 12 including an upwardly, outwardly and forwardly inclined portion 15.

A gas burner unit, generally indicated at 16, is mounted in the housing 10 and includes a cylindrical metallic gas burner tube 17 of known design and construction.

Figure 3:
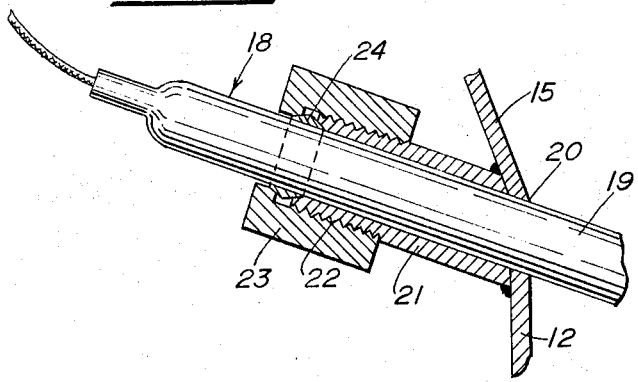
FIG. 3 is an enlarged fragmentary sectional detail view, on line 3—3 in FIG. 2, showing the mounting of the new thermostatic sensing device in position of use.
Figure 4:
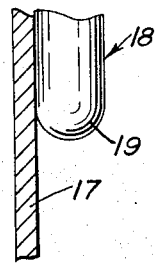
FIG. 4 is a fragmentary sectional view on line 4—4 in FIG. 1.

The present invention provides a thermostatic sensing device 18, of known design and construction, and a novel mounting arrangement therefor, and includes a thermostatic sensing tube 19 which is mounted in the housing 11 and extends through an opening 20 which is formed in one wall of the body of the housing 11, and is preferably formed at the juncture between the vertically extending lower front wall portion 12 and the upwardly inclined and forwardly extending front wall portion 15 of the body of the housing 11. The thermostatic sensing tube 19 is mounted in a tubular supporting sleeve 21 which extends angularly upwardly from the said front wall 12-15 of the body of the housing 11 and has an externally threaded upper end portion 22 on which an internally threaded clamping collar 23 is mounted; a flexible gasket 24 being mounted on the sensing tube 19 between the upper end portion of the tubular housing 21 and the clamping collar 23 (FIG. 3).

It will be noted, by reference to the drawing, that the thermostatic sensing tube 19 is mounted in such a manner that it extends tangentially angularly inwardly and downwardly from the opening 20 in which it is mounted in the front wall portion 12-15 of the housing 11 and that it engages or contacts, throughout part of its length, the cylindrical wall of the gas burner unit tube 17 but is immersed in the body of the cooking oil arranged in the housing 11 of the deep fat fryer throughout its lower portion or extent. In this manner, the thermostatic sensing device 19 is not only sensitive to and reacts to the temperature of the gas burner tube 17 but also reacts to and senses the temperature of the cooking oil surrounding the lower end portion of the sensing tube 19, and thus is sensitive to the temperature differential between the wall of the gas burner tube 17 and the cooking oil surrounding the lower portion of the thermostatic sensing tube 19.

Moreover, it will be noted, by reference to the drawing, that the mounting of the thermostatic sensing device 18 is such that it is readily inserted into position of use by inserting it downwardly through the tubular support sleeve 21 and then downwardly through the opening 20 in the front wall 12-15 and then tightening the internally threaded clamping collar 23 on the externally threaded sleeve 21 so as to compress the flexible gasket 24 against the upper end portion of the supporting tube 21 and thus clamp the sensing device 18 in position of use.

It will thus be seen from the foregoing description, considered in conjunction with the accompanying drawing, that the present invention provides a new and improved deep fat frying apparatus embodying a novel mounting and arrangement of the thermostatic sensing device and thus has the desirable advantages and characteristics, and accomplishes its intended objects, including those hereinbefore pointed out and others which are inherent in the invention.

I claim:

1. A deep fat frying apparatus comprising a housing including a body having side walls, a bottom wall and a front wall, said front wall including a lower vertically extending portion and an upper portion extending upwardly and forwardly from the said lower portion; said front wall having an opening therein, said opening being at the juncture of the said lower portion and the said upwardly and forwardly extending portion; a cylindrical gas burner tube disposed below said opening and extending through said lower portion through the body of the housing; a straight thermostatic sensing device including a portion extending through the said opening in the said one wall of the said deep fat fryer housing and extending angularly downwardly therefrom and immersed in the deep fat cooking oil in the housing, a major portion of said thermostatic device also engaging the wall of the said gas burner tube; and a tubular supporting sleeve member for said thermostat, mounted on the front face of said front wall with one end thereof in abutting contact therewith about said opening, said abutting end being rigidly secured to both the lower vertical face and the upper forwardly inclined face of the front wall, said thermostat sensing device extending through said sleeve and coupling means mounted on the said tubular sleeve member for clamping said thermostat sensing device in position of use therein.

2. The apparatus as defined in claim 1, wherein said secured abutting end is welded to both said lower portion and said upper portion of said front wall, and said sleeve member extends angularly upwardly and forwardly therefrom.

(References on following page)

References Cited by the Examiner

UNITED STATES PATENTS

| | | | |
|---|---|---|---|
| 1,602,352 | 10/1926 | Foley | 236—32 |
| 2,789,768 | 4/1957 | Kennedy | 236—32 |
| 2,846,147 | 8/1958 | Keating | 236—32 |

FOREIGN PATENTS 276,091  9/1951  Switzerland.

FREDERICK L. MATTESON, Jr., *Primary Examiner.*

ROBERT A. DUA, *Examiner.*